(12) United States Patent
Lu et al.

(10) Patent No.: US 8,995,755 B2
(45) Date of Patent: Mar. 31, 2015

(54) TWO-DIMENSIONAL TO STEREOSCOPIC CONVERSION SYSTEMS AND METHODS

(71) Applicant: Cyberlink Corp., Shindian City, Taipei (TW)

(72) Inventors: Pei-Ying Lu, Changhua County (TW); Chia-Chen Kuo, Taipei (TW); Chih-Yu Cheng, Taipei (TW)

(73) Assignee: Cyberlink Corp., Shindian, Taipei (TW)

( * ) Notice: Subject to any disclaimer, the term of this patent is extended or adjusted under 35 U.S.C. 154(b) by 135 days.

(21) Appl. No.: 13/949,372

(22) Filed: Jul. 24, 2013

(65) Prior Publication Data

US 2013/0336577 A1 Dec. 19, 2013

Related U.S. Application Data

(63) Continuation-in-part of application No. 13/249,489, filed on Sep. 30, 2011, now Pat. No. 8,705,847.

(60) Provisional application No. 61/782,409, filed on Mar. 14, 2013.

(51) Int. Cl.
| | |
|---|---|
| *G06K 9/00* | (2006.01) |
| *G06T 7/00* | (2006.01) |
| *G06T 7/20* | (2006.01) |
| *H04N 13/00* | (2006.01) |
| *H04N 13/02* | (2006.01) |

(52) U.S. Cl.
CPC ............... *G06K 9/00* (2013.01); *G06T 7/0071* (2013.01); *G06T 7/2006* (2013.01); *G06T 2207/10024* (2013.01); *G06T 2207/20144* (2013.01); *H04N 13/0037* (2013.01); *H04N 13/026* (2013.01); *H04N 13/0264* (2013.01); *H04N 2013/0085* (2013.01)
USPC .......................................................... 382/154

(58) Field of Classification Search
None
See application file for complete search history.

(56) References Cited

U.S. PATENT DOCUMENTS

| | | | |
|---|---|---|---|
| 5,974,175 | A | 10/1999 | Suzuki |
| 5,987,164 | A | 11/1999 | Szeliski et al. |
| 6,075,875 | A | 6/2000 | Gu |
| 6,847,728 | B2 | 1/2005 | Tao et al. |
| 7,043,058 | B2 | 5/2006 | Cornog et al. |
| 7,206,000 | B2 | 4/2007 | Zitnick, III et al. |

(Continued)

OTHER PUBLICATIONS

Cigla, C., Segmentation in multi-view video via color, depth and motion cues, Image Processing, 2008. ICIP 2008. 15th IEEE International Conference on Oct. 12-15, 2008, p. 2724-2727, Conference Publications.

(Continued)

*Primary Examiner* — Atiba O Fitzpatrick
(74) *Attorney, Agent, or Firm* — McClure, Qualey & Rodack, LLP (57) ABSTRACT

In one embodiment, a two-dimensional to stereoscopic conversion method, comprising: estimating a local motion region in a first image relative to one or more second images, the first and the one or more second images comprising two-dimensional images; generating a color model based on the local motion region; calculating a similarity value for each of at least one image pixel selected from the first image based on the color model; and assigning a depth value for each of the at least one image pixel selected from the first image based on the calculated similarity value to generate a stereoscopic image, the method performed by one or more processors.

29 Claims, 10 Drawing Sheets

(56) References Cited

U.S. PATENT DOCUMENTS

| | | | |
|---|---|---|---|
| 7,324,687 B2 | 1/2008 | Zitnick, III et al. | |
| 7,382,899 B2 | 6/2008 | Varekamp et al. | |
| 7,420,559 B2 | 9/2008 | Kokojima et al. | |
| 7,783,118 B2 | 8/2010 | Zhou | |
| 7,894,633 B1 | 2/2011 | Harman | |
| 7,907,793 B1 | 3/2011 | Sandrew | |
| 7,925,051 B2 | 4/2011 | Gensolen et al. | |
| 2008/0247670 A1 | 10/2008 | Tam et al. | |
| 2009/0116732 A1 | 5/2009 | Zhou et al. | |
| 2010/0080448 A1* | 4/2010 | Tam et al. | 382/154 |
| 2010/0111417 A1 | 5/2010 | Ward et al. | |
| 2010/0119147 A1 | 5/2010 | Blake et al. | |
| 2010/0231593 A1 | 9/2010 | Zhou et al. | |
| 2011/0096832 A1 | 4/2011 | Zhang et al. | |
| 2013/0063556 A1* | 3/2013 | Russell et al. | 348/42 |
| 2013/0182943 A1* | 7/2013 | Tsai | 382/154 |
| 2014/0118494 A1* | 5/2014 | Wu et al. | 348/44 |

OTHER PUBLICATIONS

Yu-Lin Chang, Depth Map Generation for 2D-to-3D Conversion by Short-Term Motion Assisted Color Segmentation, Multimedia and Expo, 2007 IEEE International Conference on Jul. 2-5, 2007, p. 1958-1961, Conference Publications.

Ramos-Diaz, E., "3D color video conversion from 2D video sequence using stereo matching technique", Circuits and Systems, 2009. MWSCAS '09. 52nd IEEE International Midwest Symposium on Aug. 2-5, 2009, p. 739-742, Conference Publications.

Kamolrat et al. "3D Motion Estimation for Depth Image Coding in 3D Video Coding", IEEE Transactions on Consumer Electronics, vol. 55, No. 2, May 2009.

Cheng et al. "A Block-Based 2D-to-3D Conversion System with Bilateral Filter" Digest of Technical Papers, International Conference on Consumer Electronics, Jan. 10-14, 2009, pp. 1-2.

Huang et al. "A Depth Extraction Method Based on Motion and Geometry for 2D to 3D Conversion" 2009 Third International Symposium on Intelligent Information Technology Application, pp. 294-298.

Fei et al. "A Color Correction Algorithm of Multi-view Video Based on Depth Segmentation" 2008 International Symposium on Computer Science and Computational Technology, pp. 206-209.

Wang et al. "Depth Maps Interpolation from Existing Pairs of Keyframes and Depth Maps for 3D Video Generation" Proceeding of 2010 IEEE International Symposium on Circuits and Systems (ISCAS), pp. 3248-3251.

Feng Xu et al. "2D-to-3D Conversion Based on Motion and Color Mergence" 3DTV Conference: The True Vision-Capture, Transmission and Display of 3D Video, May 28-30, 2008, pp. 205-208.

* cited by examiner

TWO-DIMENSIONAL TO STEREOSCOPIC CONVERSION SYSTEMS AND METHODS

CROSS REFERENCE TO RELATED APPLICATIONS

This application claims priority to, and the benefit of, copending U.S. provisional application entitled, "Two-Dimensional to Stereoscopic Conversion Systems and Methods," having Ser. No. 61/782,409, filed Mar. 14, 2013, which is entirely incorporated herein by reference. This application is also a continuation-in-part of co-pending U.S. utility application entitled, "Method and System of Two-Dimensional to Stereoscopic Conversion," having Ser. No. 13/249,489, filed Sep. 30, 2011, which is entirely incorporated herein by reference.

TECHNICAL FIELD

The present disclosure is generally related to stereoscopic systems.

BACKGROUND

Recently, 2D to 3D (e.g., stereoscopic) image conversion has become a popular technology in video playback. To generate a pair of stereo images from one single image, a common approach is to obtain a depth map by analyzing the image content. The depth map identifies the relative position of each pixel in the three-dimensional (3D) domain. With the depth map and the original two-dimensional (2D) image, 3D image conversion can be performed.

SUMMARY

In one embodiment, a two-dimensional to stereoscopic conversion method, comprising: estimating a local motion region in a first image relative to one or more second images, the first and the one or more second images comprising two-dimensional images; generating a color model based on the local motion region; calculating a similarity value for each of at least one image pixel selected from the first image based on the color model; and assigning a depth value for each of the at least one image pixel selected from the first image based on the calculated similarity value to generate a stereoscopic image, the method performed by one or more processors.

In another embodiment, a two-dimensional to stereoscopic conversion method, comprising: estimating local motion in a first image relative to a neighboring image; generating a color model based on the estimated local motion in the first image relative to the neighboring image; computing a similarity value between plural pixels of the first image and the color model; and adjusting a depth map based on the computed similarity value, the method performed by one or more processors.

In another embodiment, a two-dimensional to stereoscopic conversion method, comprising: estimating a local motion region in a first image relative to one or more second images, the first and the one or more second images comprising two-dimensional images; generating a color model based on the local motion region; calculating a similarity value for each of at least one image pixel selected from the first image based on the color model; estimating a local motion for each of the at least one image pixel selected from the first image, wherein the local motion comprises one or both of local motion distance or local motion direction; and assigning a depth value for each of the at least one image pixel selected from the first image based on the calculated similarity value and the estimated local motion to generate a stereoscopic image, the method performed by one or more processors.

In another embodiment, a two-dimensional to stereoscopic conversion system, comprising: one or more processors configured to: execute an estimating module to estimate local motion in a first image relative to one or more second images; execute a color model identifier module to generate a color model based on the estimated local motion; compute a similarity value between plural pixels of the first image and the color model; and execute a depth adjuster module to adjust a depth map based on the computed similarity value.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Disclosed herein are certain embodiments of an invention that comprises a two-dimensional to stereoscopic conversion system and method (collectively, referred to herein also as an image conversion system) that generates a depth map for two-dimensional to stereoscopic conversion. In one embodiment, the image conversion system generates a depth map according to the similarity with a color model that is trained by regions with higher local motion of input video. In other words, the color model is trained in the sense that it is generated based on ascertaining which regions (e.g., pixels) of a processed image comprise motion that meets or exceeds a predetermined threshold of motion (e.g., motion vector length is higher than a predetermined value), and using those identified regions to further ascertain a color distribution (e.g., luminance and chrominance, such as YUV, though RGB may be used in some embodiments). Select colors from the distribution are determined and weighted (e.g., prioritized), resulting in the color model.

Digressing briefly, in conventional stereoscopic systems, depth maps may be used to generate a pair of stereo images from a single source. However, one possible bottleneck of stereoscopic image conversion lies in the process of depth map generation. For instance, it is not easy to separate image objects with obvious motion from the background and then assign different depths for the objects with different motion since a small segmentation error may cause serious stereoscopic conversion artifacts. Certain embodiments of image conversion systems, as described below, may improve the quality of two-dimensional to stereoscopic conversion based on motion for video.

Having broadly summarized certain features of image conversion systems and methods of the present disclosure, reference will now be made in detail to the description of the disclosure as illustrated in the drawings. While the disclosure is described in connection with these drawings, there is no intent to limit the disclosure to the embodiment or embodiments disclosed herein. Although the description identifies or describes specifics of one or more embodiments, such specifics are not necessarily part of every embodiment, nor are all various stated advantages associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Figure 1:
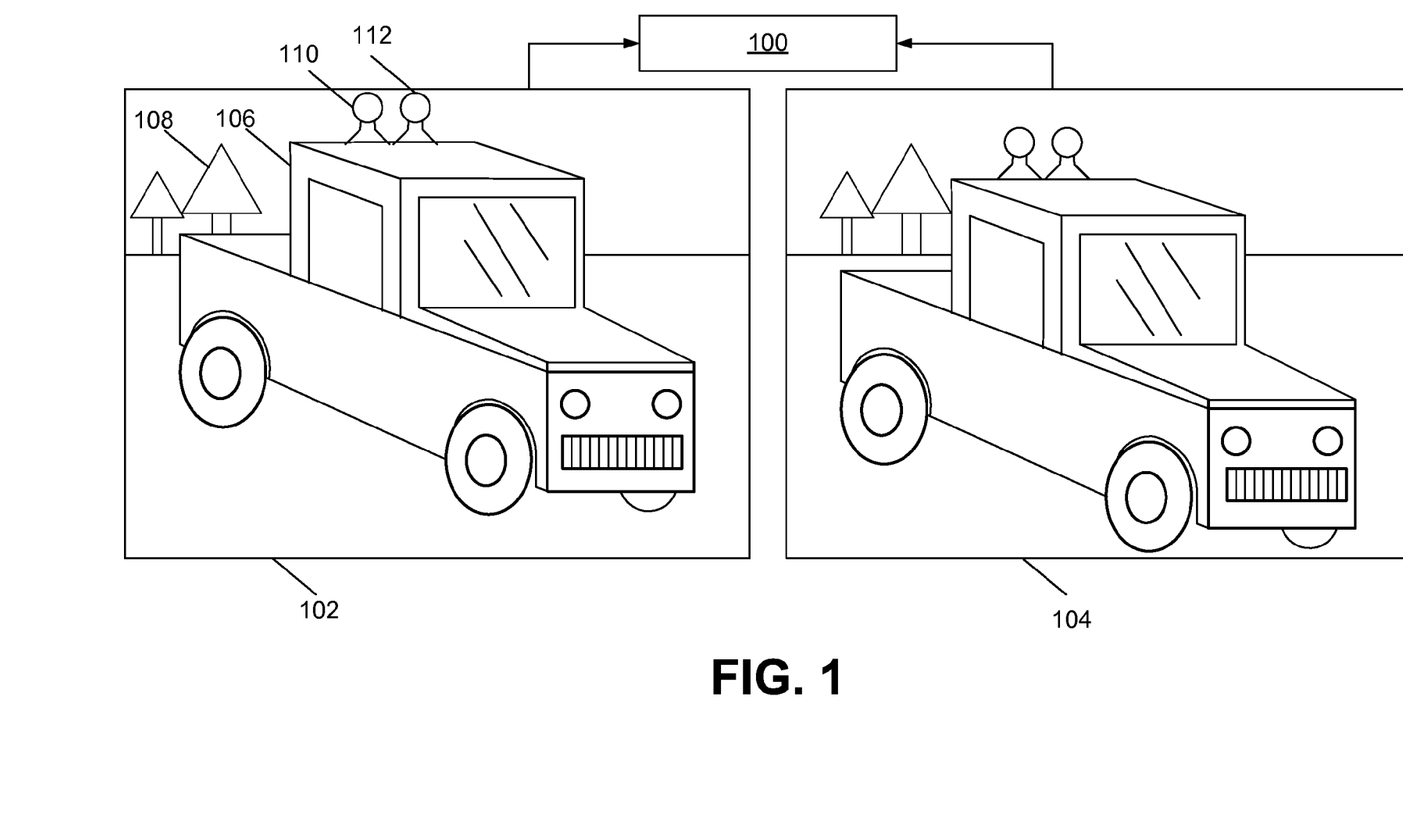
FIG. 1 is a schematic diagram that illustrates a frame sequence comprising two images temporally displaced from each other and which are processed by an embodiment of an image conversion system.

Attention is directed to FIG. 1, which illustrates example processing of two images of a picture or frame sequence by an embodiment of an image conversion system 100. The images 102 and 104 are temporally displaced from one another, the image 102 being captured earlier in time than the image 104. In other words, for the example depicted in FIG. 1, the image 104 is the image to be processed by the image conversion system 100, and the image 102 represents a prior captured image serving as a reference to the image 104 for purposes of motion estimation, as explained further below. Note that this example is merely illustrative, and that similar principles apply if the image 102 is to be the image processed with the image 104 serving as a reference to the image 102 for motion estimation. Images 102 and 104 refer to frame images (e.g., progressive scan format), with the understanding that the images may be contemplated as field frames (e.g., interlaced scan format), as each are considered interchangeable for purposes of discussion. Using the prior (e.g., adjacent, though not limited to being adjacent) image 102 as an example, with the understanding that similar features are shown in the other images, the image 102 comprises a vehicle 106 that is in motion (e.g., heading toward the reader, as reflected in FIG. 1 and other figures with a downward direction relative to the horizon). The vehicle 106 carries passengers, including two passengers 110 and 112 at the rear of the vehicle 106. Background objects, such as trees 108, are depicted in different locations from one frame to another, signifying for instance that an observer of the approaching vehicle 106 is moving from right to left (which makes the trees 108 appear as if they are moving from left to right). The image conversion system 100, which may be a computing device (or component(s) thereof) as described further below, receives these images 102 and 104 as part of an image sequence, and performs various processing.

Figure 2A:
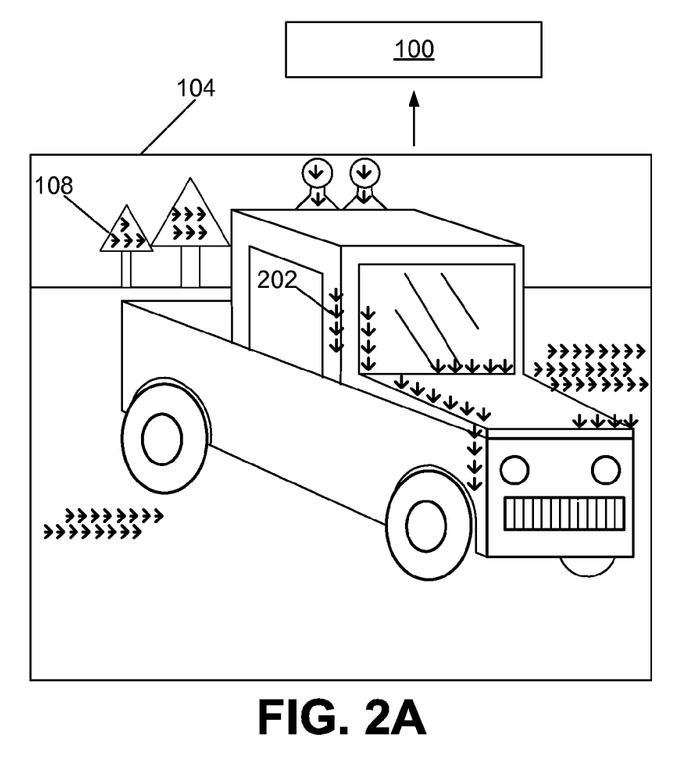
FIGS. 2A and 2B are schematic diagrams that illustrate an image subject to motion estimation and motion thresholding by an embodiment of an image conversion system.

Referring to FIG. 2A, the image 104 is processed based on motion estimation (relative to the prior, adjacent image 102 in FIG. 1). For instance, in one embodiment, the image conversion system 100 performs well-known block-based motion estimation on the entire image 104 (relative to one or more reference frames or portions (e.g., slices, macroblocks, etc.) thereof, such as a forward image, prior image (e.g., image 102, FIG. 1), or a combination of both (e.g., through the use of additional frames than shown)), as represented in FIG. 2A with motion estimation lines (e.g., vectors) 202. Each vector 202 is shown as either of a higher value (e.g., by generally longer length, vertical downward-pointing lines, such as found in the foreground on the moving vehicle or its passengers) or smaller value (e.g., as generally shorter length, horizontal and right-ward pointing lines, such as the surrounding environment or background, such as the trees 108). It should be appreciated within the context of the present disclosure that additional vector lengths and/or directions are contemplated, but for simplicity and ease of illustration, only two different lengths and directions are shown per figure. Note further that other motion vectors may be present in each frame but for purposes of not unduly complicating these and other applicable figures, only a representative sample is shown in FIG. 2A and subsequent figures. In addition, though described herein in the context of adjacent frames or images, it should be appreciated that frames from non-adjacent images (e.g., separated by one or more frames) may be used in motion estimation processing in some embodiments, as should be appreciated by one having ordinary skill in the art.

Figure 2B:
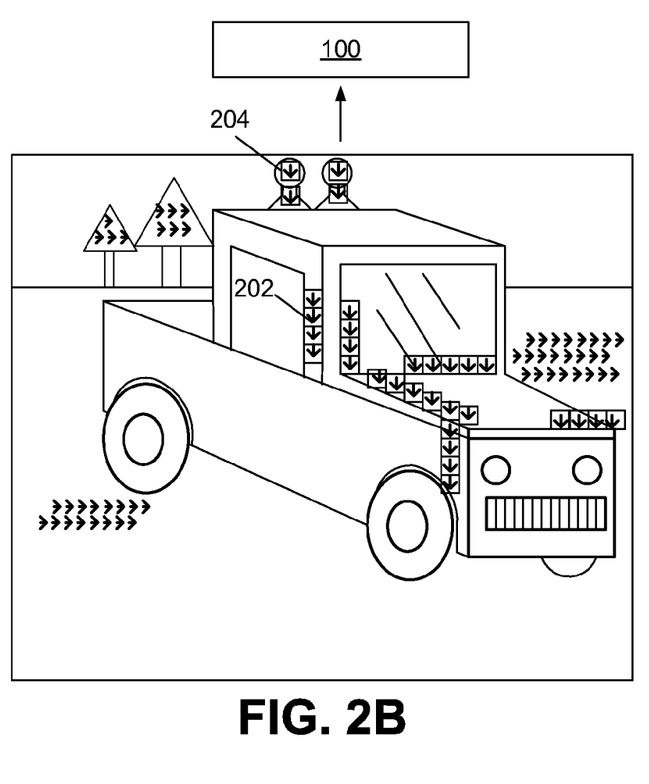

In FIG. 2B, illustrated are a plurality of logical blocks 204, each block encompassing (e.g., associated with) one or more motion vectors 202 resulting from the block-based motion estimation illustrated in FIG. 2A. The logical blocks 204 represent underlying processing performed by certain embodiments of the image conversion system 100 to enable a determination of local motion. It should be appreciated that only a representative portion of blocks 204 is shown to avoid unduly complicating these and other applicable figures. The image conversion system 100 employs thresholding (e.g., comparing local motion to a predetermined motion threshold) to determine regions with higher, block-based local motion, and logically identifies these regions with the blocks 204 (e.g., using identifying mechanisms such as flags, bitmaps, coding, etc.).

Figure 3:
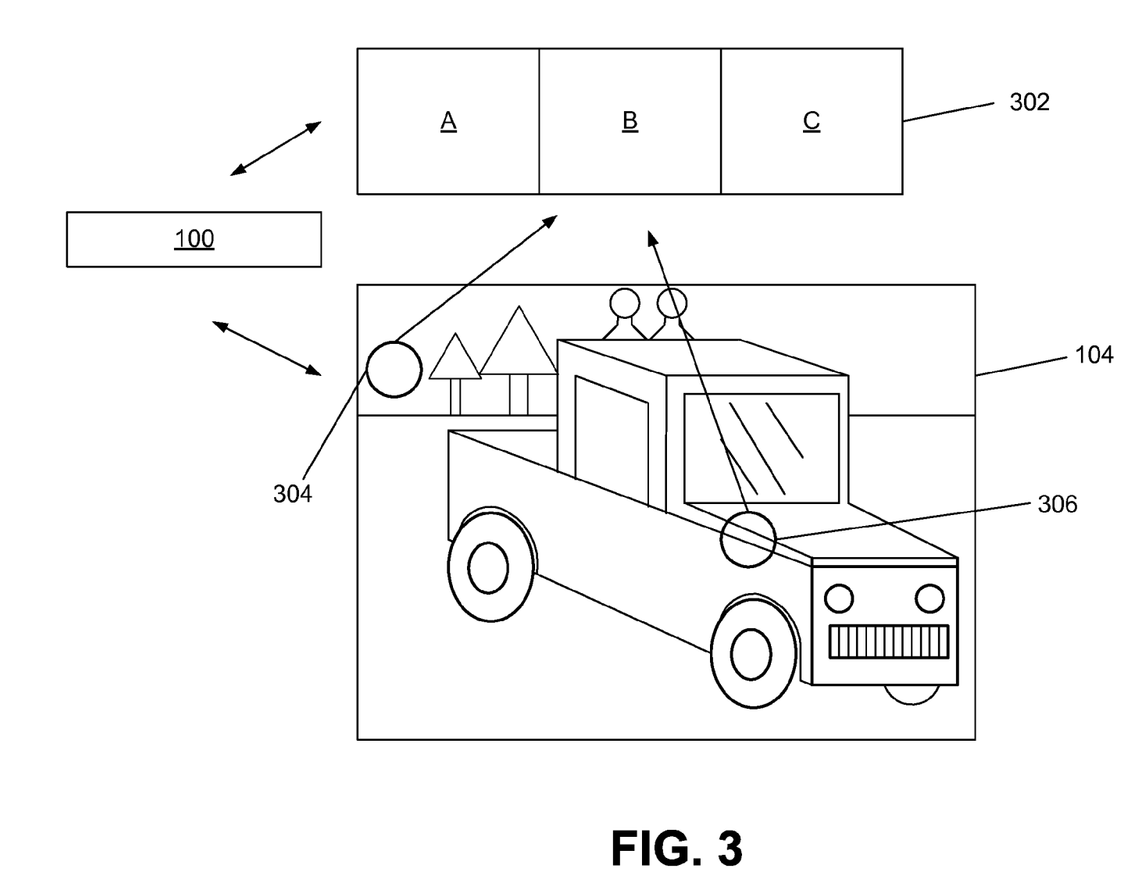
FIG. 3 is a schematic diagram that illustrates training of a color model and similarity computations based on the color model by an embodiment of an image conversion system.

In FIG. 3, the image conversion system 100 generates a color model 302 based on an analysis of the motion in the logical blocks 204 (FIG. 2B). In one embodiment, the image conversion system 100 constructs a histogram of pixels in the regions with higher local motion, and computes (e.g., calculates) prime colors. For instance, in the embodiment depicted in FIG. 3, prime colors referred to by classifiers (also, color classifiers) A, B, and C are determined, where A, B, and C may each represent any of a plurality of distinct and different colors determined as predominantly comprising the respective pixels of the respective regions of the corresponding local motion. Although three (3) prime colors are shown in FIG. 3, it should be appreciated that greater or fewer numbers of colors may be selected in some embodiments. The image conversion system 100 weighs (e.g., prioritizes) the histogram to construct the color model 302 (e.g., if the weighting of the histogram is higher, the color is more representative).

For instance, if the color space is based on the YUV format, the color model 302 may be represented as $C_i$ ($y_i$, $u_i$, $v_i$), where i=0, 1, 2 ... etc.

Note that color model generation is based on local motion. Further, candidate pixels corresponding to the regions of higher local motion among the processed image and adjacent (and non-adjacent) images are collected in the image conversion system 100 of the present disclosure and the resultant histogram is subject to a weighted averaging to construct the color model, unlike prior systems.

In one embodiment, as noted above, one or more prime colors may be determined based on a histogram from the local motion. A similarity value (e.g., corresponding to similarity among pixels to a color model) may be calculated as follows. For instance, assume (without limitation) that the dynamic range of the color scale RGB may comprise (0, 0, 0) to (255, 255, 255). Calculation of similarity values (e.g., from the color distance) may be achieved according to the following formula (1):

$$\text{Similarity} = 1 - \frac{\min\limits_{i} \sqrt{(\text{Prime}[j].R - \text{Pixel}.R)^2 + (\text{Prime}[j].G - \text{Pixel}.G)^2 + (\text{Prime}[j].B - \text{Pixel}.B)^2}}{255\sqrt{3}}, \quad (1)$$

where "i" refers to the $i^{th}$ prime color.

In some embodiments, the calculation of similarity values may be based on the Gaussian Mixture model, as indicated above. For instance (and without limitation), given a Gaussian Mixture Model G from the local motion, and assuming K is the number of Gaussian, $\pi_R$ is the weight of each Gaussian, k=1~K, $N(\mu_k, \Sigma_k)$ is the distribution of each Gaussian, k=1~K. Then, for a color pixel $X_i$, the probability of $X_i$ in G (as well as the similarity value) is determined according to Equation (2) below:

$$\text{Similarity} = \Sigma_{K-1}^{K} \pi_k N(X_i | \mu_K, \Sigma_K) \quad (2).$$

The image conversion system 100 then computes the similarity value between the color model 302 and each pixel in the image 104, as shown graphically by the circle and arrow combination 304 and 306 (e.g., representing a comparison of low and high local motion pixels, respectively, to color classifier "B" of the color model 302). The image conversion system 100 assigns a higher similarity value to a high motion region 306, and a lower similarity value to a region of low motion 304. The image conversion system 100 assigns a higher similarity value based on the similarity between one or more prime colors in the color model 302 and the colors in the image.

From the similarity values assigned to each pixel of the image 104, the image conversion system 100 assigns a depth value of each of the pixels in the image 104. For instance, in one embodiment, the image conversion system 100 gives (e.g., assigns) a closer depth value to the pixel with higher similarity value; and gives a far depth value to the pixel with a lower similarity value. It should be appreciated within the context of the present disclosure that the similarity values may be configured in any manner that enables a distinction of the foreground and background pixels of a given image portrait. For instance, byte-based values (e.g., ranging from 0-255) or float-type values (e.g., 0.0-1.0) may be employed in some embodiments.

One result of the depth value assignments is that the image conversion system 100 generates and/or adjusts a depth map, with distinctions between background and foreground readily apparent. The image conversion system 100 adjusts the depth map (e.g., adjusts values of the depth map) based on the computed similarity values. In one embodiment, higher similarity values correspond to pixels located in higher local motion regions. The image conversion system 100 assigns a higher depth value (e.g., depth map value) to pixels of high local motion areas. Regions with higher depth values, such as an object on a screen, appear closer to a viewer (e.g., when watching stereoscopic video). Stated differently, the image conversion system 100 adjusts the depth value by the similarity values: a high similarity value equates to a high depth map value, and a small similarity value equates to a small depth map value.

From the depth map, additional processing (e.g., depth image based rendering, or DIBR) may be implemented to transform a source image (for example, image 104) and the depth map to a stereoscopic view. In some embodiments, the depth map may be generated according to other methods and modified by the assigned depth values according to the methods employed by the two-dimensional to stereoscopic conversion system.

It is noted that some embodiments may employ feature extraction based on implementation of a feature map or model, as disclosed in the priority application incorporated by reference in the beginning of the disclosure, and hence discussion of the same is omitted here for brevity.

Figure 4:
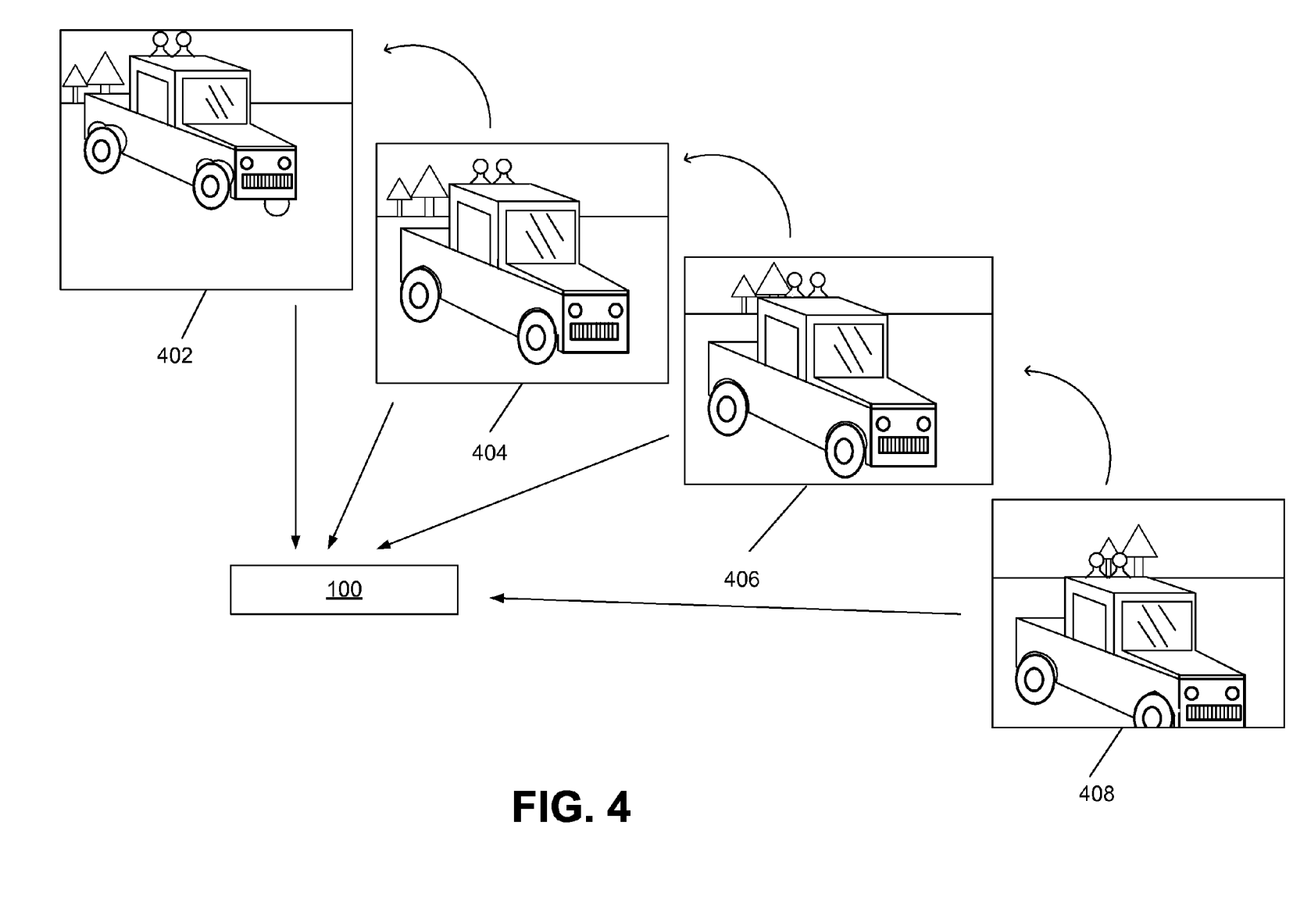
FIG. 4 is a schematic diagram that illustrates a frame sequence comprising temporally displaced source images received and processed by an embodiment of an image conversion system.

Having described an example implementation of an embodiment of an image conversion system 100, attention is directed to FIG. 4, which illustrates yet another example implementation for an image conversion system 100. Briefly, the image conversion system 100 described previously used a prior frame (or image 102) as the reference image for purposes of motion estimation. In FIG. 4, the forward image is used as the reference image. It should be appreciated within the context of the present disclosure that both the forward and prior images (or portions thereof), adjacent or otherwise, may be used as reference images, and plural images may be used as reference images. In particular, shown in FIG. 4 is a sequence of video frames (e.g., images) 402, 404, 406, and 408 captured progressively in time, where the image conversion system 100 uses a forward image to determine local motion (as opposed to a prior image, as described in association with FIG. 1). As noted above, it should be appreciated that in some embodiments, a combination of both forward and prior images may be used to determine motion estimation in some embodiments. Referring to FIG. 4, image 408 represents one frame of the sequence at time, t+1. The image 406 represents another frame of the sequence at current time, t (which is one frame prior in time to t+1). Images 404 and 402 represent additional frames at t−1 and t−2, respectively, relative to the current time, t.

Figure 5:
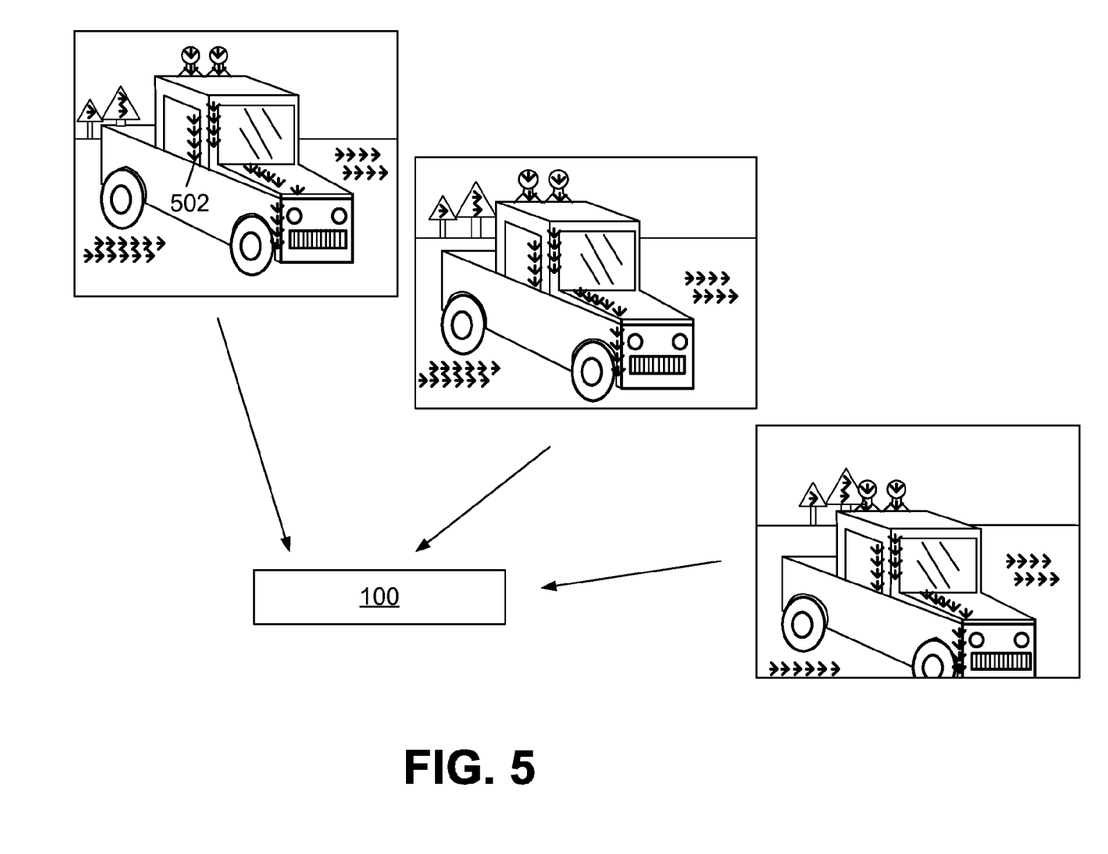
FIG. 5 is a schematic diagram that illustrates an embodiment of an image conversion system referencing forward images to perform motion estimation.

To perform motion estimation, the image conversion system 100 references the forward image (e.g., when the current image is image 406, image 406 references image 408, or if the current image is image 404, image 404 references 406, etc.). Motion vectors 502 and the employment of motion estimation by the image conversion system 100 are shown in FIG. 5, as similarly described previously, the discussion of which is omitted here for brevity.

Figure 6:
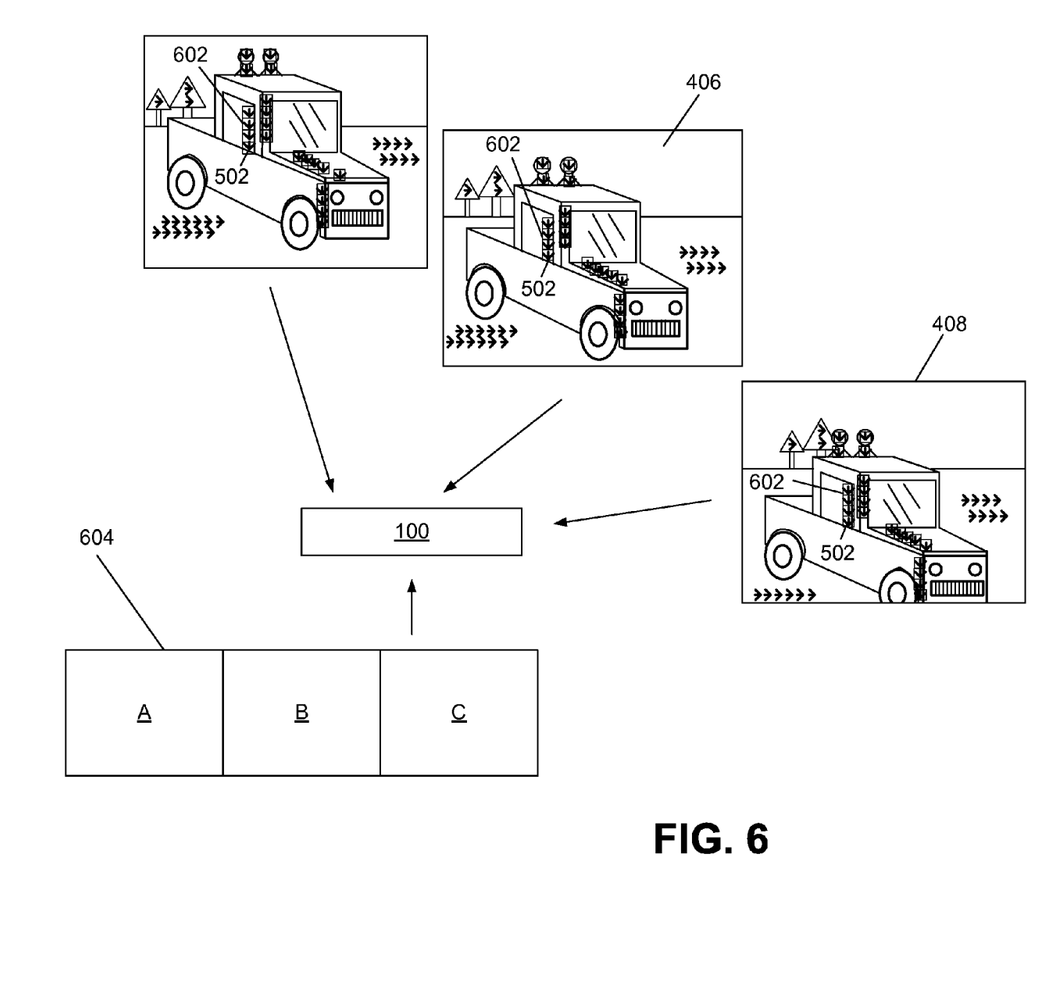
FIG. 6 is a schematic diagram that illustrates selecting regions based on motion thresholding and training of a color model by an embodiment of an image conversion system.

Referring to FIG. 6, the image conversion system 100 estimates local motion and selects the region(s) 602 (e.g., blocks) where the strength of local motion exceeds a predetermined motion threshold. A color model 604 is generated (e.g., with different prime colors represented by color classifiers A, B, and C), the color model 604 generated via temporal smoothing. For instance, in one embodiment, the image conversion system 100 collects (e.g., determines) candidate pixels in the regions 602 with higher local motion in the current image 406 and an adjacent (e.g., neighboring, such as forward image) image 408, and generates a histogram. Note that a neighboring image refers to an adjacent image (e.g., prior or forward), but may also include in some embodiments an image that is not necessarily adjacent the processed image (e.g., separated from the processed image by one or more images). The image conversion system 100 computes a weighted average of the histogram and constructs the color model 604. If the histogram of the previous image is $H_{i-1}$, and the histogram of the current image is $H_i$, a weighted average can be applied to $H_i$ and $H_{i-1}$ to obtain a final histogram, $H_f$, the latter used to construct the color model 604. Stated more formulaically, the weighting may be calculated as $w_{(i-1)} + w_{(i)} + w_{(i+1)} = 1$, and $H_f$ is as follows:

$H_f = w_{(i-1)} \times H_{(i-1)} + (1 - w_{(i-1)}) \times H_i$, where $H_{(i-1)}$ is weighted heavier than $H_i$. Where the histogram of the next image is $H_{i+1}$, then $H_f$ may be calculated as follows:

$$H_f = w_{(i-1)} \times H_{(i-1)} + w_{(i)} \times H_i + w_{(i+1)} \times H_{(i+1)}$$

The image conversion system 100 computes the similarity values between the color model 604 and each of the pixels of the images 406 and 408 (e.g., current and forward or adjacent images), and adjusts the value of the depth map. As before, if the similarity value is higher (e.g., the pixel corresponds to a region with higher local motion), then a higher depth map value is assigned (and the object appears closer to the viewer while watching stereoscopic video).

In some embodiments, additional post-processing may be employed, such as erosion processing to improve the stereoscopic image effect, smooth processing, temporal processing, space processing, among other processing.

Figure 7:
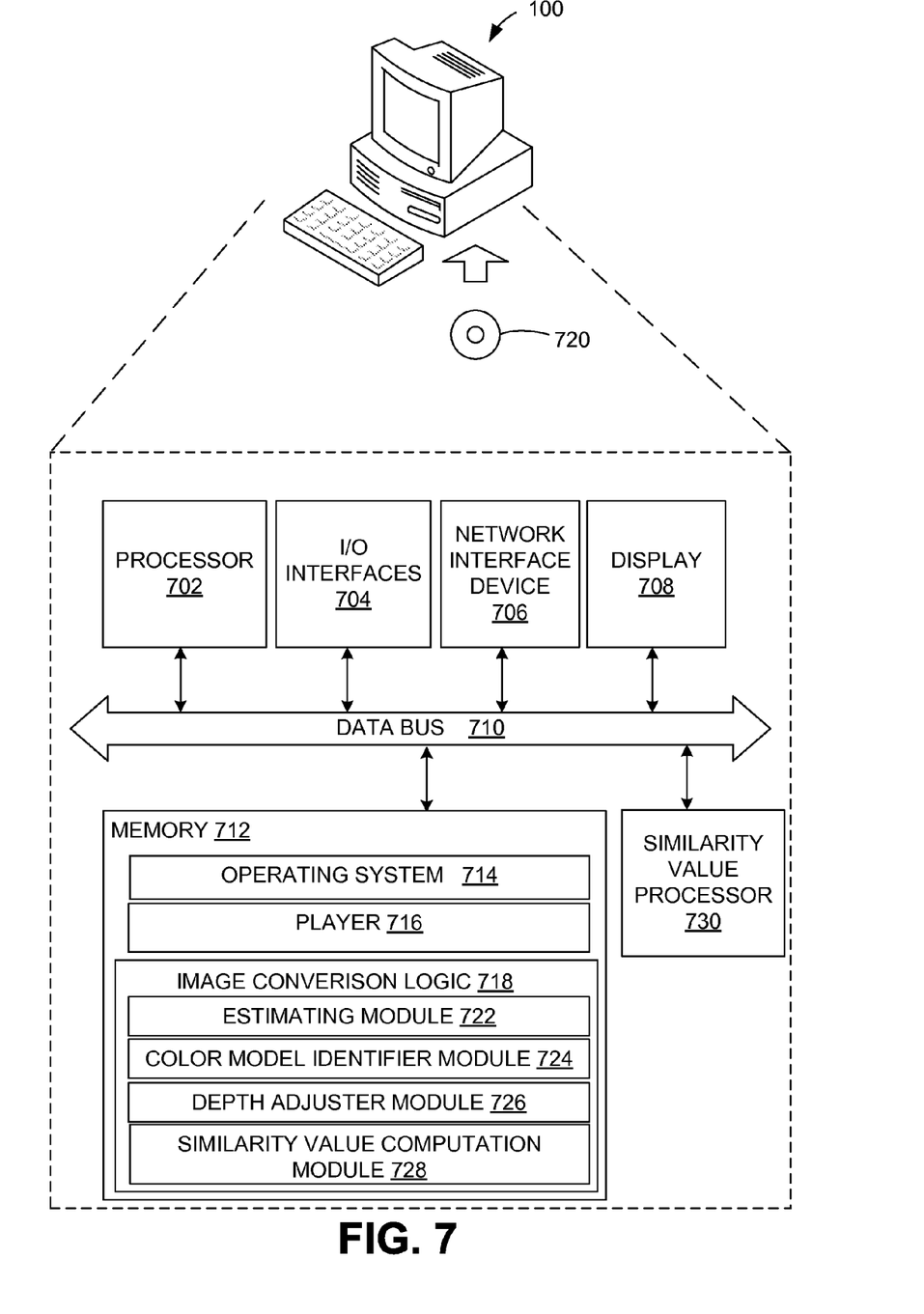
FIG. 7 is a block diagram that illustrates an embodiment of an image conversion system.

Having described an example operation of certain embodiments of an image conversion system 100, attention is directed to FIG. 7, which illustrates an embodiment of an image conversion system 100 embodied as a computing system. The image conversion system 100 may be embodied in the entirety of the computing system depicted in FIG. 7, or as a subset thereof in some embodiments (or additional components in some embodiments). The example image conversion system 100 is shown as including a computing system (e.g., personal computer), though it should be appreciated within the context of the present disclosure that the image conversion system 100 may comprise any one of a plurality of computing systems or devices, including a dedicated player appliance, set-top box, laptop, computer workstation, cellular phone, personal digital assistant (PDA), handheld or pen based computer, embedded appliance, or other communication (wired or wireless) device. In some embodiments, an image conversion system may be implemented on a network device (also referred to herein as a computing system), similar to the image conversion system 100, located upstream of the system 100, such as a server, router, gateway, etc., or implemented with similar functionality distributed among plural devices (e.g., in a server device and a computing device). An upstream network device may be configured with similar components, and hence discussion of the same is omitted for brevity.

The image conversion system 100 may, for instance, comprise one or more processors, such as processor 702, one or more input/output interfaces 704 (I/O interfaces), a network interface device 706, and a display 708 connected across a data bus 710. The image conversion system 100 may further comprise a memory 712 that includes an operating system 714 and application specific software, such as a player application 716 ("player," or also, referred to herein as player logic) in the case of implementing player functionality for the playback of media content, such as video and/or audio (e.g., movies, music, games, etc.). The memory 712 may further comprise image conversion logic 718 which comprises the two-dimensional to stereoscopic conversion functionality described above. In some embodiments, the player application 716 (and/or image conversion logic 718) may be implemented as a software program configured to read and play back content residing on a disc 720 (or from other high definition video sources) according to the specifications defined by standards such as the Blu-ray Disc format specification, HD-DVD, etc.

The image conversion logic 718 comprises executable code (e.g., executable by the processor 702) that is grouped into modules that include an estimating module 722, a color model identifier module 724, a depth adjuster module 726, and a similarity computation module 728. It should be appreciated that the grouping of modules may take on other forms in some embodiments, where functionality of some of the modules may be combined or further distributed among additional modules. In addition, in some embodiments, one or more of the functionality of the image conversion logic 718 may be implemented in software, hardware, or a combination of software and hardware. The estimating module 722, when executed by the processor 702, is configured to estimate local motion in a given image relative to adjacent and/or non-adjacent images. The color model identifier module 724 is configured to generate a color model based on attributes of local motion, such as an amount of local motion, direction of local motion, change in local motion, among other attributes. The depth adjuster module 726 is configured to generate and adjust a depth map based on similarity value computations performed by the processor 702 executing the similarity value computation module 728. The similarity value computation module 728 is configured to compute similarity values between plural pixels of a given image and a color model. Note that in some embodiments, a dedicated processor (e.g., a similarity value processor 730) may be employed to perform the functionality associated with the processor 702 executing the similarity value computation module 728.

The processor 702 (and in some embodiments, the similarity value processor 730) may include any custom made or commercially available processor, a central processing unit (CPU) or an auxiliary processor among several processors associated with the image conversion system 100, a semiconductor based microprocessor (in the form of a microchip), one or more ASICs, a plurality of suitably configured digital logic gates, and other well-known electrical configurations comprising discrete elements both individually and in various combinations to coordinate the overall operation of the computing system.

The memory 712 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 712 typically comprises the native operating system 714, one or more native applications, emulation systems, or emulated applications for any of a variety of operating systems and/or emulated hardware platforms, emulated operating systems, etc. For example, the applications may include application specific software stored on a computer readable medium (e.g., memory, persistent storage, etc.) for execution by the host processor 702 and may include the operating system 714, the player application 716, and the image conversion logic 718. One of ordinary skill in the art should appreciate that the memory 712 may, and typically will, comprise other components which have been omitted for purposes of brevity.

Input/output interfaces 704 provide any number of interfaces for the input and output of data. For example, where the image conversion system 100 comprises a personal computer, these components may interface with a user input device, which may be a body part of a viewer (e.g., hand), keyboard, a mouse, or voice activated mechanism. Where the image conversion system 100 comprises a handheld device (e.g., PDA, mobile telephone), these components may interface with function keys or buttons, a touch sensitive screen, a stylus, body part, etc. The input/output interfaces 704 may further include one or more disc drives (e.g., optical disc drives, magnetic disc drives) to enable playback of multimedia content residing on the computer readable medium 720.

The network interface device 706 comprises various components used to transmit and/or receive data over a network environment. By way of example, the network interface device 706 may include a device that can communicate with both inputs and outputs, for instance, a modulator/demodulator (e.g., a modem), wireless (e.g., radio frequency (RF)) transceiver, a telephonic interface, a bridge, a router, network card, etc. The image conversion system 100 may further comprise mass storage (not shown). For some embodiments, the mass storage may include a data structure (e.g., database) to store image files. In some embodiments, the image and data files may be located in a remote storage device (e.g., network storage).

The display 708 may comprise a computer monitor or a plasma screen for a PC or a liquid crystal display (LCD) on a hand held device, head-mount device, or other computing device. In some embodiments, the display 708 may be separate from the image conversion system 100, and in some embodiments, integrated in the computing device.

In the context of this disclosure, a "computer-readable medium" stores one or more programs and data for use by or in connection with the instruction execution system, apparatus, or device. The computer readable medium is non-transitory, and may be, for example, but not limited to, an electronic, magnetic, optical, electromagnetic, infrared, or semiconductor system, apparatus, or device. More specific examples (a non-exhaustive list) of the computer-readable medium may include, in addition to those set forth above, the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), and a portable compact disc read-only memory (CDROM) (optical).

Figure 8:
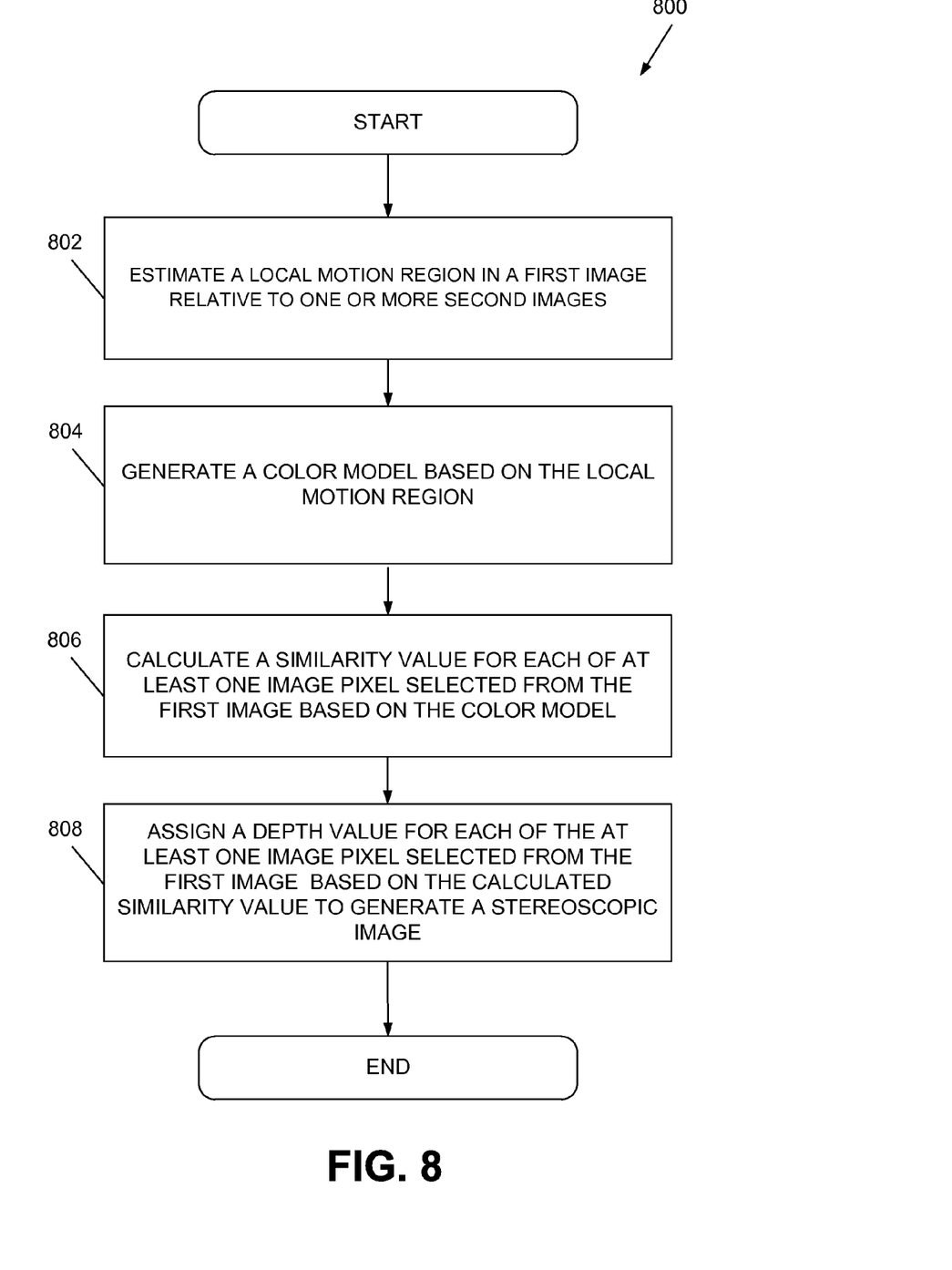
FIG. 8 is a flow diagram that illustrates one embodiment of an image conversion method.

Having provided a detailed description of certain embodiments of image conversion systems and methods, it should be appreciated that one embodiment of an image conversion method 800, implemented by one or more processors of the image conversion system 100 and depicted in FIG. 8, comprises estimating a local motion region in a first image relative to one or more second images (802). For instance, the first and one or more second images comprise two-dimensional images. In some embodiments, local motion estimation involves a global motion component (e.g., the motion that takes place opposite to that of the camera, or stated otherwise, motion associated with non-optical flow motion vectors as opposed to optical flow motion vectors). For instance, in one embodiment, the estimation of local motion comprises using, for the one or more second images, one or more neighboring images, such as one or more forward and/or prior images (adjacent and/or non-adjacent), as reference image(s) to estimate motion of every region in a processed image, using the estimated motion to calculate global motion in known manner (e.g., according to a mean-shift algorithm, according to an average of estimated motion of every region, etc.), including finding small motion in the regions as global motion, such as where a region is close to a boundary of a frame, and out of one hundred regions of the frame, eighty regions have similar direction and size indicating global motion in a given image, and obtaining the local motion by subtracting global motion from the estimated motion. In some embodiments, the motion estimation of every region in the processed image comprises estimating motion by a pixel-based method (e.g., block matching, optical flow, phase-correlation algorithm, etc.) or a feature-based method (e.g., a particle filter method, or a method comprising detecting features and applying a statistical function, etc.).

The method 800 further comprises generating a color model based on the local motion region (804). The generation of the color model includes training the color model, wherein the training includes collecting candidates in the pixel regions with higher local motion, and classifying the candidates based on a dominant feature such as color (and/or texture in some embodiments). The method 800 further includes calculating a similarity value for each of at least one image pixel selected from the first image based on the color model (806); and assigning a depth value for each of the at least one image pixel selected from the first image based on the calculated similarity value to generate a stereoscopic image (808).

Figure 9:
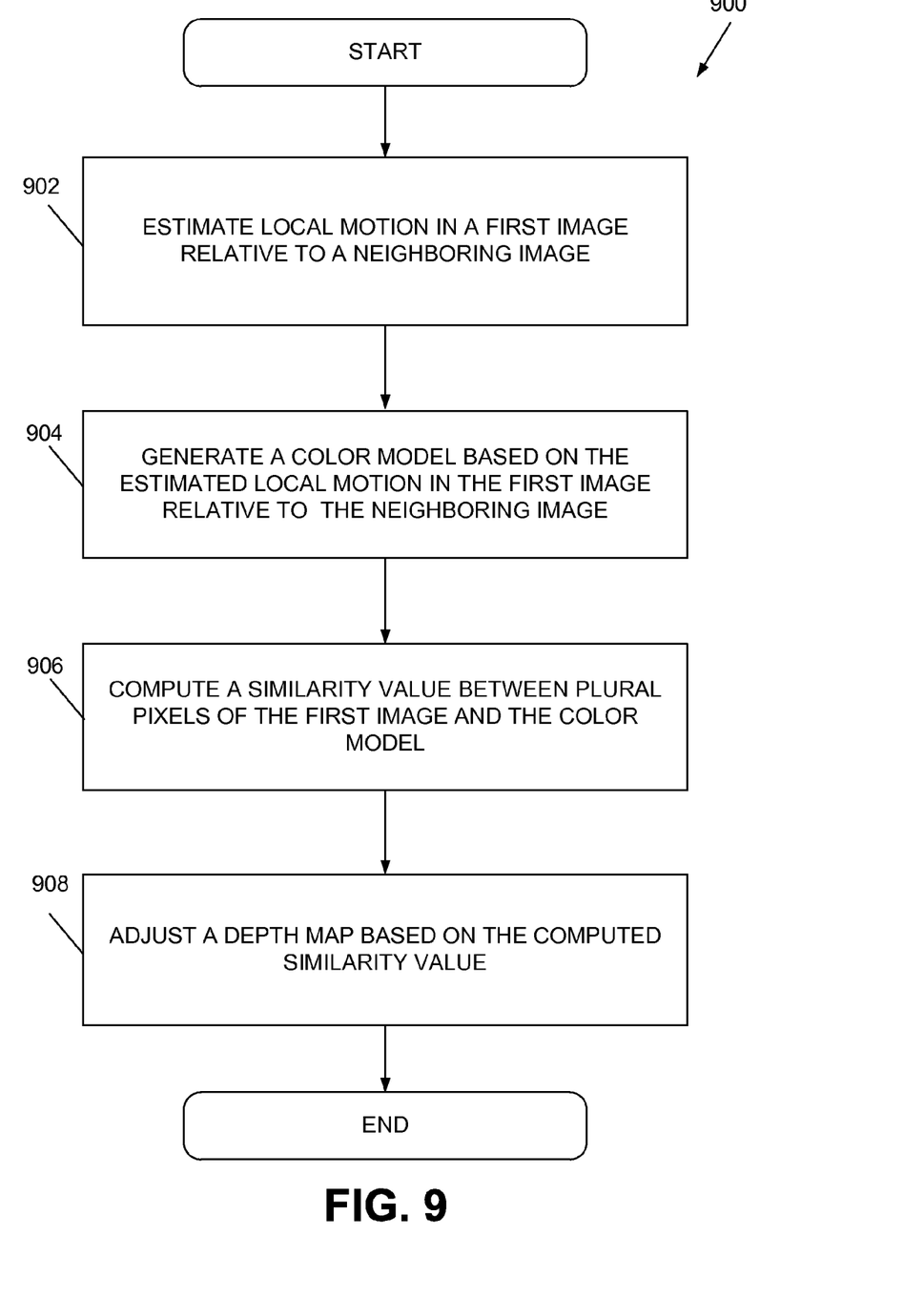
FIG. 9 is a flow diagram that illustrates another embodiment of an image conversion method.

In view of the foregoing disclosure, it should be appreciated that another embodiment of an image conversion method 900, implemented by one or more processors of the image conversion system 100 and depicted in FIG. 9, comprises estimating local motion in a first image relative to a neighboring image (902); generating a color model based on the estimated local motion in the first image relative to the neighboring image (904); computing a similarity value between plural pixels of the first image and the color model (906); and adjusting a depth map based on the computed similarity value (908).

Figure 10:
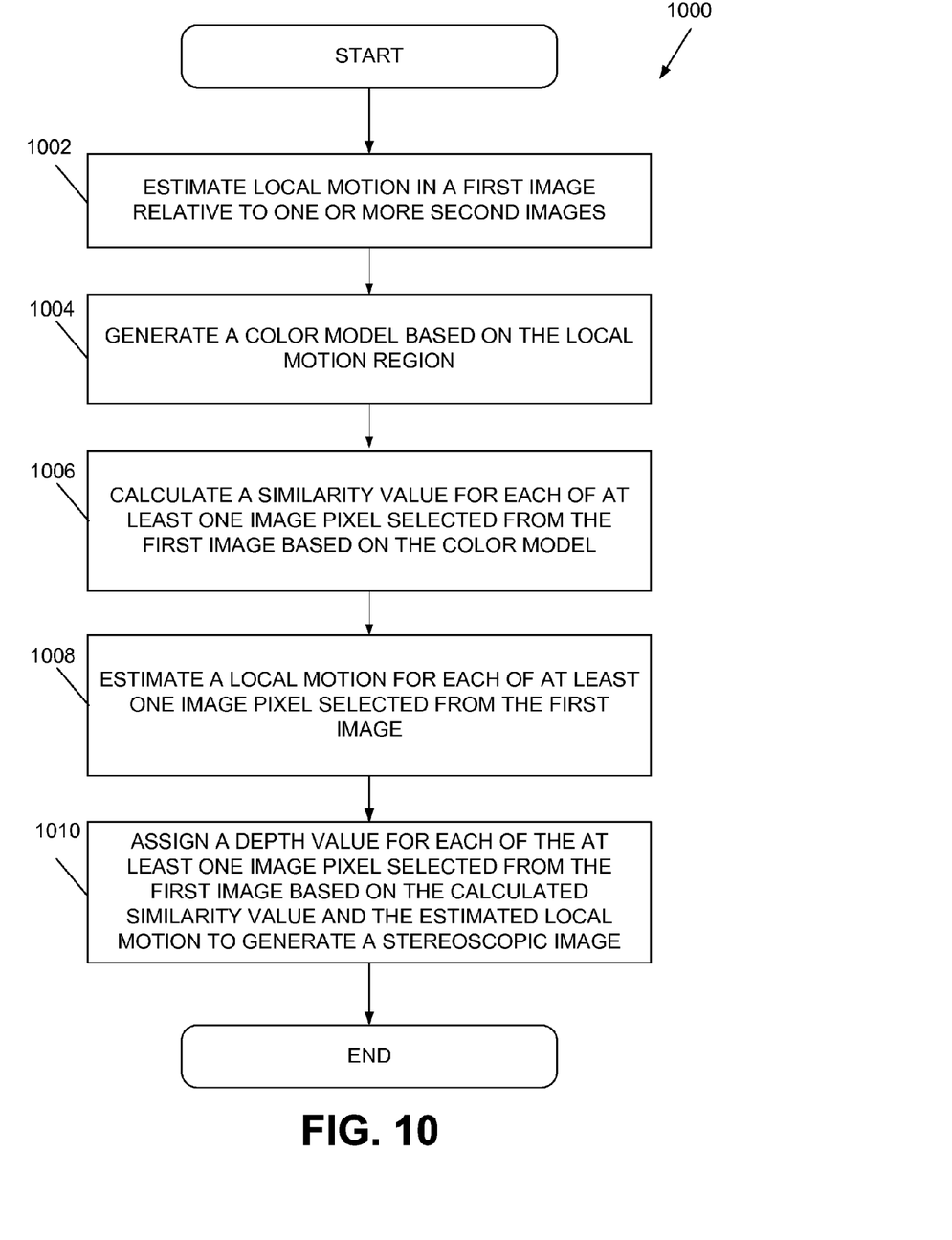
FIG. 10 is a flow diagram that illustrates another embodiment of an image conversion method.

In view of the foregoing disclosure, it should be appreciated that yet another embodiment of an image conversion method 1000, implemented by one or more processors of the image conversion system 100 and depicted in FIG. 10, comprises estimating a local motion region in a first image relative to one or more second images (1002). The first and second images comprise two-dimensional images. The method 1000 further comprises generating a color model based on the local motion region (1004), and calculating a similarity value for each of at least one image pixel selected from the first image based on the color model (1006). The method 1000 further comprises estimating a local motion for each of the at least one image pixel selected from the first image (1008). For instance, the local motion may comprise one or both of local motion distance or local motion direction. The method 1000 further comprises assigning a depth value for each of the at least one image pixel selected from the first image based on the calculated similarity value and the estimated local motion to generate a stereoscopic image (1010).

In one embodiment, responsive to the similarity value being greater than a defined value and the local motion distance of the estimated local motion being greater than a defined value, the assigning further comprises assigning a relatively high depth value to the at least one image pixel. As previously described, a high depth value corresponds to an object that is closer to the viewer than if the depth value was lower. In some embodiments, responsive to the similarity value being greater than a defined value and the local motion direction of the estimated local motion being downward, the assigning further comprises assigning a relatively high depth value to the at least one image pixel.

Any process descriptions or blocks in flow diagrams should be understood as representing modules, segments, or portions of code which include one or more executable instructions for implementing specific logical functions or steps in the process, and alternate implementations are included within the scope of the embodiments of the present disclosure in which functions may be executed out of order from that shown or discussed, including substantially concurrently or in reverse order, and/or with one or more functions omitted in some embodiments, depending on the functionality involved, as would be understood by those reasonably skilled in the art of the present disclosure. Also, though certain architectures are illustrated in the present disclosure, it should be appreciated that the methods described herein are not necessarily limited to the disclosed architectures.

In addition, though various delineations in software logic have been depicted in the accompanying figures and described in the present disclosure, it should be appreciated that one or more of the functions performed by the various logic described herein may be combined into fewer software modules and or distributed among a greater number. Further, though certain disclosed benefits/advantages inure to certain embodiments of certain image conversion systems, it should be understood that not every embodiment necessarily provides every benefit/advantage.

In addition, the scope of certain embodiments of the present disclosure includes embodying the functionality of certain embodiments of an image conversion system in logic embodied in hardware and/or software-configured mediums. For instance, though described in software configured mediums, it should be appreciated that one or more of the image conversion system and method functionality described herein may be implemented in hardware or a combination of both hardware and software.

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A two-dimensional to stereoscopic conversion method, comprising:
   estimating a local motion region in a first image relative to one or more second images, the first and the one or more second images comprising two-dimensional images;
   generating a color model based on the local motion region;
   calculating a similarity value for each of at least one image pixel selected from the first image based on the color model; and
   assigning a depth value for each of the at least one image pixel selected from the first image based on the calculated similarity value to generate a stereoscopic image, the method performed by one or more processors.

2. The method of claim 1, wherein the one or more second images comprise one or more neighboring images.

3. The method of claim 2, wherein the one or more neighboring images comprise a forward image, a prior image, or a combination of both.

4. The method of claim 2, wherein the one or more neighboring images comprise an adjacent image, a non-adjacent image, or a combination of both.

5. The method of claim 1, wherein estimating further comprises:
   using for the one or more second images or one or more neighboring images as a reference image or reference images to estimate motion of every region in the first image;
   using the estimated motion to calculate global motion; and
   obtaining the local motion by subtracting the global motion from the estimated motion.

6. The method of claim 5, wherein estimating motion of every region in the first region comprises estimating motion by a pixel-based method or a feature-based method.

7. The method of claim 6, wherein the pixel-based method comprises block-matching, optical flow or a phase correlation algorithm.

8. The method of claim 6, wherein the feature-based method comprises steps of detecting features and applying a statistical function.

9. The method of claim 6, wherein the feature-based method comprises a particle filter method.

10. The method of claim 5, wherein using the estimated motion to calculate global motion is according to an average of estimated motion of every region.

11. The method of claim 5, wherein using the estimated motion to calculate global motion is according to a mean-shift algorithm.

12. The method of claim 1, wherein generating further comprises determining one or more prime colors from image pixel colors based on a statistical clustering method.

13. The method of claim 1, wherein responsive to the similarity value being greater than a defined value, the assigning further comprises assigning a relatively high depth value to the at least one image pixel, wherein the high depth value corresponds to an object that is closer to the viewer than if the depth value was lower.

14. The method of claim 1, wherein responsive to the similarity value being less than a defined value, the assigning further comprises assigning a relatively low depth value to the at least one image pixel, wherein the low depth value corresponds to an object that is farther from the viewer than if the depth value was higher.

15. The method of claim 1, further comprising performing post-processing on the assigned depth value, wherein the post-processing comprises erosion processing, smooth processing, temporal processing, or spatial processing, or a combination of two or more of the post-processing.

16. The method of claim 1, wherein generating further comprises training the color model, wherein the training comprises collecting candidates in pixel regions of the first image with higher local motion, and classifying the candidates based on prime colors of the pixel regions.

17. A two-dimensional to stereoscopic conversion method, comprising:
   estimating local motion in a first image relative to a neighboring image;
   generating a color model based on the estimated local motion in the first image relative to the neighboring image;
   computing a similarity value between plural pixels of the first image and the color model; and
   adjusting a depth map based on the computed similarity value, the method performed by one or more processors.

18. The method of claim 17, wherein generating further comprises:

determining which of the plural pixels of the first image corresponds to a motion relative to the neighboring image that is greater than a predefined motion threshold; and determining one or more prime colors from image pixel colors based on a statistical clustering method.

19. The method of claim 18, wherein determining the one or more prime colors further comprises performing a weighted average.

20. A two-dimensional to stereoscopic conversion method, comprising:

estimating a local motion region in a first image relative to one or more second images, the first and the one or more second images comprising two-dimensional images;

generating a color model based on the local motion region;

calculating a similarity value for each of at least one image pixel selected from the first image based on the color model;

estimating a local motion for each of the at least one image pixel selected from the first image, wherein the local motion comprises one or both of local motion distance or local motion direction; and assigning a depth value for each of the at least one image pixel selected from the first image based on the calculated similarity value and the estimated local motion to generate a stereoscopic image, the method performed by one or more processors.

21. The method of claim 20, wherein responsive to the similarity value being greater than a defined value and the local motion distance of the estimated local motion being greater than a defined value, the assigning further comprises assigning a relatively high depth value to the at least one image pixel, wherein the high depth value corresponds to an object that is closer to the viewer than if the depth value was lower.

22. The method of claim 20, wherein responsive to the similarity value being greater than a defined value and the local motion direction of the estimated local motion being downward, the assigning further comprises assigning a relatively high depth value to the at least one image pixel, wherein the high depth value corresponds to an object that is closer to the viewer than if the depth value was lower.

23. A two-dimensional to stereoscopic conversion system, comprising:

one or more processors configured to:

execute an estimating module to estimate local motion in a first image relative to one or more second images;

execute a color model identifier module to generate a color model based on the estimated local motion;

compute a similarity value between plural pixels of the first image and the color model; and execute a depth adjuster module to adjust a depth map based on the computed similarity value.

24. The system of claim 23, wherein the one or more second images include a forward image, a prior image, a non-adjacent image, or any combination thereof.

25. The system of claim 23, wherein the one or more processors are further configured to execute the estimating module to:

use the one or more second images as a reference image or reference images to estimate motion of every region in the first image;

use the estimated motion to calculate global motion; and obtain the local motion by subtracting the global motion from the estimated motion.

26. The system of claim 23, wherein the one or more processors are further configured to execute the color model identifier module to generate by:

determining which of the plural pixels of the first image corresponds to a motion relative to the one or more second images that exceeds a predetermined motion threshold; and classifying each of the plural pixels exceeding the predetermined motion threshold according to a defined feature, the defined feature comprising color.

27. The system of claim 23, wherein the one or more processors are further configured to compute by:

computing a similarity value in color between each of the plural pixels and each color classifier of the color model.

28. The system of claim 23, wherein responsive to the similarity value for one of the plural pixels being:

greater than a defined value, the one or more processors are further configured to execute the depth adjuster module to adjust by assigning a relatively high depth value to the one of the plural pixels, wherein the high depth value corresponds to an object that is closer to the viewer than if the depth value was lower; and less than a defined value, the one or more processors are further configured to execute the depth adjuster module to adjust by assigning a relatively low depth value to the one of the plural pixels, wherein the low depth value corresponds to an object that is further from the viewer than if the depth value was higher.

29. The system of claim 23, wherein the computing is performed by the one or more processors executing a similarity value computation module.

* * * * *